Dec. 22, 1925.
P. B. PARKS ET AL
1,566,918
HEATING SYSTEM
Original Filed April 20, 1923
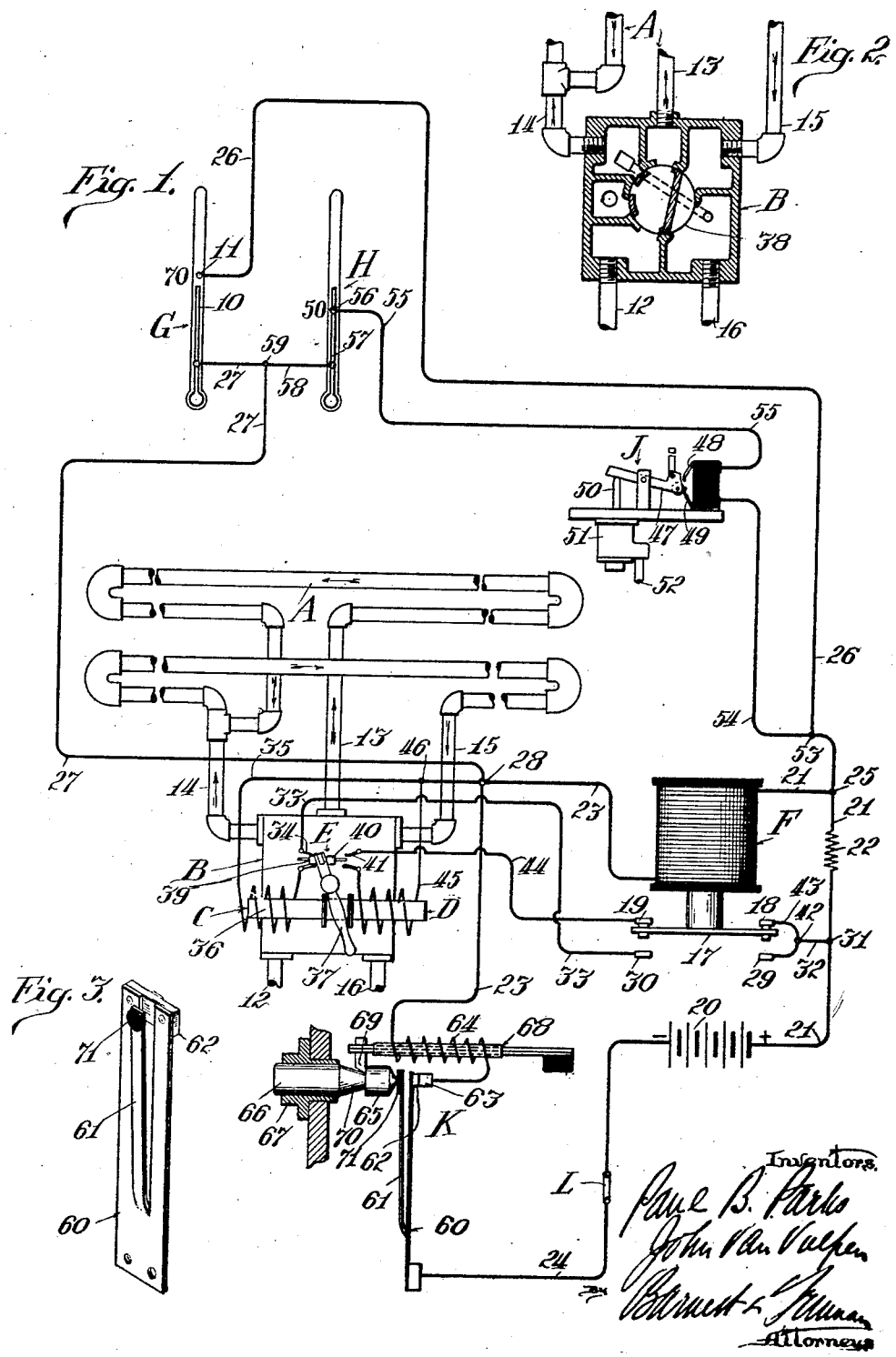

Patented Dec. 22, 1925.

1,566,918

UNITED STATES PATENT OFFICE.

PAUL B. PARKS, OF OAK PARK, AND JOHN VAN VULPEN, OF CHICAGO, ILLINOIS, ASSIGNORS TO VAPOR CAR HEATING COMPANY, INC., OF CHICAGO, ILLINOIS, A CORPORATION OF NEW YORK.

HEATING SYSTEM.

Application filed April 20, 1923, Serial No. 633,405. Renewed June 22, 1925.

*To all whom it may concern:*

Be it known that we, PAUL B. PARKS and JOHN VAN VULPEN, citizens of the United States, residing at Oak Park, Illinois, and Chicago, Illinois, respectively, have invented certain new and useful Improvements in Heating Systems, of which the following is a specification.

Our invention relates to a heating system intended more especially for the heating of railway cars by the circulation of steam at relatively low pressure in which the introduction of steam to the radiator or radiators and the outflow of the heating medium therefrom is governed by a valve moved by an electric motor under the control of a thermostatic mechanism so that the opening and closing valve movements are brought about automatically in response to temperature fluctuations in the car. A system of this type is shown in the patent to E. A. Russell granted January 2, 1923, No. 1,440,701, the radiator valve in this case being rotated in opposite directions by a pair of alternately energized solenoids, a limit switch being provided for cutting off the current from each solenoid as soon as it has effected the movement of the valve.

Our invention has for its object an improvement in a heating system of this general type, which improvement is designed to automatically cut off the current from one or the other of the solenoid coils, as the case may be, if the limit switch fails to accomplish this result because of the sticking of the valve or other cause, so as to prevent the solenoid coil from being damaged by overheating. These coils are designed for momentary energization only and are likely to be burned out, or otherwise injured, if subjected for any considerable period of time to a current of the intensity required for moving the valve.

The invention is illustrated in a preferred embodiment, in the accompanying drawing, wherein Fig. 1 is a diagram illustrating the heating system as a whole with the improvement of our invention embodied therein.

Fig. 2 is a vertical sectional view of the radiator valve, and

Fig. 3 is a view, in perspective, of the spring contact member for cutting off current from the valve motor coils in case of the emergency above noted.

Referring first to Fig. 1, A designates a radiator of the type shown incidentally in the patent above mentioned and disclosed and claimed in the patent to Russell & Geissinger, granted January 2, 1923, No. 1,440,-702. B designates the valve device for controlling the circulation of heating medium through radiator A; C and D are solenoid coils for moving the radiator valve in opposite directions; E is a limit switch which cuts off current from each of the solenoid coils C and D as soon as the valve has been moved from its closed to its open position, or vice versa, as the case may be. F is a relay for directing current to coils C or D in response to the operation of a high temperature thermostat G or a low temperature thermostat H, whichever may be in control of the heating system. J is a pressure operated selector switch, the position of which determines whether the thermostat G or the thermostat H shall control the apparatus.

We will first summarize the operation of the heating system so far as concerns the elements thereof above enumerated and will then describe our improvement on the same.

With the parts of the apparatus in the positions in which they are shown in Fig. 1, the high temperature thermostat G is in control and as the mercury column 10 of this thermostat has not reached contact 11 thereof, valve B is in its open position and steam is circulated through the radiator A. 12 designates the steam supply pipe leading to valve B, 13 the inlet end of the radiator, 14, 15 the return pipes from the radiator to the valve, and 16 the discharge from the valve. Relay F is energized to raise the bridging member 17 against an upper pair of contacts 18, 19, the current flowing through the relay over the following circuit:

Circuit No. 1: Battery 20, wire 21 in which is arranged resistance 22, coil of relay F, wire 23, circuit breaker K, to be described, the circuit through which is normally closed, and wire 24 to the battery.

As soon as the mercury column 10 of thermostat G touches contact 11, a circuit is closed which is in parallel with circuit No. 1 and is as follows:

Circuit No. 2: Circuit No. 1 to binding post 25, wire 26, contact 11, mercury column 10, wire 27, binding post 28 on wire 23, and thence to the battery over circuit No. 1.

The closing of circuit No. 2 reduces the current flow through the relay sufficiently to cause it to drop its armature whereupon the bridging member 17 falls upon contacts 29, 30 closing a circuit through the radiator valve closing solenoids C as follows:

Circuit No. 3: Battery 20, wire 21 to binding post 31, wire 32, contact 29, bridging member 17, contact 30, wire 33, circuit closer 34 of limit switch E, coil C, wire 35 to binding post 28, and thence over circuit No. 1 to the battery.

The energization of coil C draws the common solenoid core 36 to the left rocking the lever 37 to which is fixed the rotary valve body 38 (Fig. 2) of valve B to its closing position. As soon as this movement is completed the circuit No. 3 through coil C is broken by the opening of circuit closer 34, the lever 37 carrying the movable contact 39 of circuit closer 34. The lever also carries, on the other side, the movable contact 40 of a circuit closer 41 which is closed when the circuit closer 34 is open.

If the temperature in the car falls below the temperature at which the high temperature thermostat G operates, 70° Fahrenheit for example, circuit No. 2 is broken at 10, 11, relay F is energized, raising the bridging member 17 against contacts 18 and 19, and a circuit is closed through the radiator valve opening solenoid coil D as follows:

Circuit No. 4: Circuit No. 3 to binding post 42, wire 43, contact 18, bridging member 17, contact 19, wire 44, circuit closer 41, which is now closed, coil D, wire 45, binding post 46 on wire 27, and thence over circuit No. 3 to the battery.

Low temperature thermostat H is put into control of the system through the operation of the selector switch J which is, by preference, operated automatically.

In the type of heating system shown the selector switch J is located in series with the low temperature thermostat H and breaks this circuit when there is air pressure in one of the air train pipes of the car, the switch arm 47 of the solenoid switch being tilted away from the gap between contacts 48, 49 through the action of a plunger 50 in an air cylinder 51 connected by pipe 52 to the air train line just mentioned. The contemplated operation assumes that this air train pipe will be supplied with air when the car is connected in a train with the locomotive but will be free of air pressure when the car is cut off from the locomotive and is out of service. When the car is thus cut off from the locomotive and its air train line pressure dissipated the arm 47 of the selector switch is moved to bridge the gap between contacts 48 and 49. This closes a circuit through the low temperature thermostat H. Assuming an outside temperature of less than 50° Fahrenheit, the temperature at which the low temperature thermostat H is designed to function, the dropping of the car temperature below 70° Fahrenheit will not bring about the opening of the radiator valve since current can now flow through the low temperature thermostat circuit and keep the relay F short circuited. The circuit through the low temperature thermostat H is as follows:

Circuit No. 5: Circuit No. 2 to binding post 53, wire 54, contact 49, switch arm 47 of the selector switch J, contact 48, wire 55, contact 56 of the low temperature thermostat H, mercury column 57 of the same, wire 58 to binding post 59 on wire 27, and thence to the battery over circuit No. 2.

As soon as the temperature of the car falls below 50° Fahrenheit the circuit No. 5 is broken, relay F is energized and the coil D is energized to bring about an opening movement of the radiator valve. When the temperature reaches 50° the relay F is again short circuited and the radiator valve closed.

It may happen that the valve B may be clogged or otherwise disabled so that it fails to close or open under the action of the solenoid coils C or D, or the limit switch E might be disabled so as not to cut off the current from the coil C or D, as the case may be, after the valve had been closed or opened. In such case the continued energization of the solenoid coil would be likely to burn it out as these coils are not designed to carry the heavy currents necessary for moving the valve for any considerable length of time. To meet this contingency the circuit breaker K is provided between wires 23 and 24. This device is preferably constructed as follows: 60 is a spring switch arm having an elastic tongue 61 and carrying a contact 62 designed to engage a contact 63 at the end of a resistance coil 64 constructed so as to develop heat when subject to a flow of current therethrough for a short time. The other end of this coil is connected with wire 23. The spring tongue 61 is provided with an insulating block 71 bearing against the end of a plunger 66 slidably mounted in a guiding sleeve 67. The coil 64 surrounds or is arranged adjacent to a bi-metallic bar 68 or other heat sensitive element. This device is shown as provided with a latch 69 engaging a grooved portion 70 of plunger 66. Before the current, in the contingency mentioned, has flowed through the solenoid coil C or D for a long enough time to injure the coil it will have developed enough heat in coil 64 to warp the bi-metallic bar 68 so as to withdraw latch 69 from contact with the plunger 66. In its normal or circuit closing position the switch arm 60 is flexed. As soon as plunger 66 is released by latch 69 the switch arm will react breaking the circuit between contacts 62 and 63.

Since the circuit breaker K is arranged in the common return wire of the circuits through coils C and D the separation of contacts 62, 63 will cut off the current from either one of these coils that may be energized. When the heat sensitive device cools the latch 69 will be brought to bear against the inner cylindrical portion 65 of plunger 66. If the apparatus has been repaired the circuit may be closed through circuit breaker K but if the repair has not been made pushing in plunger 66 will result merely in the reopening of the circuit through the circuit breaker K as soon as coil 64 heats up.

Preferably a switch L is arranged in the conductor 24 so that the control apparatus can be made inoperative if desired.

While we have described our invention in a preferred embodiment, it will be understood that we contemplate any and all structural modifications within the scope of the annexed claims.

We claim:

1. In a heating system, the combination of a radiator, a valve to control the circulation of heating medium through said radiator, an electric motor for operating said valve which, in normal operation, is energized only momentarily, a circuit breaker in the motor circuit, and an electrically actuated heating element in circuit with the motor and heat sensitive element associated with said heating element which when heated causes the circuit breaker to break the motor circuit.

2. In a heating system, the combination of a radiator, a valve to control the circulation of heating medium through said radiator, an electric motor for operating said valve which, in normal operation, is energized only momentarily, a circuit breaker in the motor circuit, an electrically actuated heating element in circuit with the motor and heat sensitive element associated with said heating element which when heated causes the circuit breaker to break the motor circuit, and manually operable means for reestablishing the circuit through the circuit breaker.

3. In a heating system, the combination of a radiator, a valve to control the circulation of heating medium through said radiator, an electric motor for operating said valve which, in normal operation, is energized only momentarily, a circuit breaker in the motor circuit having a spring which when released reacts to break the circuit through the motor, an electrically actuated heating element in circuit with the motor, and a heat sensitive element associated with said heating element which when heated releases said spring.

4. In a heating system, the combination of a radiator, a valve to control the circulation of heating medium through said radiator, an electric motor for operating said valve which, in normal operation, is energized only momentarily, a circuit breaker in the motor circuit comprising a spring which when released reacts to break the circuit through the motor, a plunger against which said spring bears, an electrically actuated heating element in circuit with the motor, a heat sensitive element associated therewith, and a latch associated with said heat sensitive element which when the heat sensitive element is cold holds the plunger in position to close the circuit through the circuit breaker and when heated up releases said plunger.

5. In a heating system, the combination of a radiator, a rotary valve to control the circulation of heating medium through the radiator, a pair of solenoid coils for rotating said valve alternately in opposite directions, a limit switch to break the circuit through each of said coils at the end of the valve movement produced by such coil, an electrically actuated heating element in circuit with said coils, a normally closed circuit breaker to break the circuits through said coils, and a heat sensitive element associated with said heating element to actuate said circuit breaker.

6. In a heating system, the combination of a radiator, a valve to control the circulation of heating medium through the radiator, a pair of solenoid coils for moving said valve alternately in opposite directions, a limit switch to break the circuit through each of said coils at the end of the valve movement produced by such coil, a heat resistance coil in circuit with said solenoid coils, a thermo couple associated with said heat resistance coil, a spring switch arm in circuit with the solenoid coils, a plunger which bears against said switch arm in the closing position of the latter, and a latch on said thermo couple to engage the plunger and hold the same in its circuit closing position when the thermo couple is cold and which is withdrawn by the warping of the thermo couple when heated to release said plunger.

7. In a heating system, the combination of a radiator, a valve to control the circulation of heating medium through the radiator, an electric motor for operating said valve which in norml operation is energized only momentarily, and heat sensitive means in the motor circuit actuated when heated to break the circuit through the motor.

8. In a heating system, the combination of a radiator, a valve to control the circulation of heating medium through the radiator, an electric motor for operating said valve, and heat sensitive means in the motor circuit actuated when heated to break the circuit through the motor.

9. In a heating system, the combination of a radiator, a valve to control the circulation of heating medium through the radiator, an electric motor for operating said valve, and heat sensitive means in the motor circuit actuated by prolonged passage of current to break the circuit through the motor.

10. In a heating system, the combination of a radiator, a valve to control the circulation of heating medium through the radiator, an electric motor for operating said valve, and a circuit breaker comprising a heating coil in the motor circuit and a heat sensitive means actuated when heated to break the circuit through the motor.

PAUL B. PARKS.
JOHN VAN VULPEN.